US011847555B2

United States Patent
Eykholt et al.

(10) Patent No.: US 11,847,555 B2
(45) Date of Patent: Dec. 19, 2023

(54) CONSTRAINING NEURAL NETWORKS FOR ROBUSTNESS THROUGH ALTERNATIVE ENCODING

(71) Applicant: International Business Machines Corporation, Armonk, NY (US)

(72) Inventors: Kevin Eykholt, White Plains, NY (US); Taesung Lee, Ridgefield, CT (US); Ian Michael Molloy, Ridgefield, CT (US); Jiyong Jang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 17/112,628

(22) Filed: Dec. 4, 2020

(65) Prior Publication Data

US 2022/0180157 A1 Jun. 9, 2022

(51) Int. Cl.
*G06N 3/063* (2023.01)
*G06N 3/082* (2023.01)
*G06N 3/048* (2023.01)

(52) U.S. Cl.
CPC ............. *G06N 3/063* (2013.01); *G06N 3/048* (2023.01); *G06N 3/082* (2013.01)

(58) Field of Classification Search
CPC ..................................................... G06N 3/082
See application file for complete search history.

(56) References Cited

U.S. PATENT DOCUMENTS

| | | | |
|---|---|---|---|
| 10,210,860 B1 | 2/2019 | Ward et al. | |
| 10,496,898 B2 | 12/2019 | Zisimopoulos et al. | |
| 10,540,959 B1 | 1/2020 | Ward et al. | |
| 10,685,284 B2 | 6/2020 | Symth et al. | |
| 10,720,151 B2 | 7/2020 | Sypniewski et al. | |
| 2018/0322537 A1* | 11/2018 | Driemeyer | G06N 3/0454 |
| 2020/0311542 A1* | 10/2020 | Wang | G06F 16/245 |

OTHER PUBLICATIONS

Zhang et al., "Efficient Neural Network Robustness Certification with General Activation Functions," arXiv:1811.00866 [cs.LG], NIPS 2018.

(Continued)

*Primary Examiner* — Tsu-Chang Lee
(74) *Attorney, Agent, or Firm* — Anthony Pallone; Jeffrey S. LaBaw; David H. Judson

(57) ABSTRACT

A neural network is augmented to enhance robustness against adversarial attack. In this approach, a fully-connected additional layer is associated with a last layer of the neural network. The additional layer has a lower dimensionality than at least one or more intermediate layers. After sizing the additional layer appropriately, a vector bit encoding is applied. The encoding comprises an encoding vector for each output class. Preferably, the encoding is an n-hot encoding, wherein n represents a hyperparameter. The resulting neural network is then trained to encourage the network to associated features with each of the hot positions. In this manner, the network learns a reduced feature set representing those features that contain a high amount of information with respect to each output class, and/or to learn constraints between those features and the output classes. The trained neural network is used to perform a classification that is robust against adversarial examples.

24 Claims, 3 Drawing Sheets

(56) References Cited

OTHER PUBLICATIONS

Ebrahimi, J., "Robustness of Neural Networks for Discrete Input: An Adversarial Perspective," PHD Dissertation, Dec. 2018.
Xie, et al., "Smooth adversarial training," arXiv:2006.14536 [cs.LG], Jun. 25, 2020.
Schott et al, "Towards the First Adversarially Robust Neural Network Model on MNIST," arXiv:1805.09190 [cs.CV], Dec. 2018.

* cited by examiner

CONSTRAINING NEURAL NETWORKS FOR ROBUSTNESS THROUGH ALTERNATIVE ENCODING

BACKGROUND

Technical Field

This disclosure relates generally to information security and, in particular, to protect a neural network against adversarial attack.

Background of the Related Art

Machine learning technologies, which are key components of state-of-the-art Artificial Intelligence (AI) services, have shown great success in providing human-level capabilities for a variety of tasks, such as image recognition, speech recognition, and natural language processing, and others. Most major technology companies are building their AI products and services with deep learning models (e.g., deep neural networks (DNNs)) as the key components. Building a production-level deep learning model is a non-trivial task, which requires a large amount of training data, powerful computing resources, and human expertise. For example, the creation of a Convolutional Neural Network (CNN) designed for image classification may take from several days to several weeks on multiple GPUs with an image dataset having millions of images. In addition, designing a deep learning model requires significant machine learning expertise and numerous trial-and-error iterations for defining model architectures and selecting model hyper-parameters.

Deep learning has been shown to be effective in a variety of real-world applications such as computer vision, natural language processing and speech recognition. It also has shown great potentials in clinical informatics such as medical diagnosis and regulatory decisions, including learning representations of patient records, supporting disease phenotyping and conducting predictions. Recent studies, however, show that these models are vulnerable to adversarial attacks, which attacks are design to intentionally inject small perturbations (also known as "adversarial examples") to a model's data input to cause misclassifications. In image classification, researchers have demonstrated that imperceptible changes in input can mislead the classifier. In the text domain, synonym substitution or character/word level modification on a few words can also cause the model to misclassify. These perturbations are mostly imperceptible to humans but can easily fool a high-performance deep learning model.

Since the discovery of adversarial examples, numerous techniques have been proposed to defend neural networks against them, but such techniques either are expensive, or brittle. To date, only data augmentation has been shown to be effective. The first data augmentation defense, adversarial training, involves iteratively generating adversarial examples during training and adding these samples as additional training inputs. Although integrating adversarial samples in model training is effective in defending neural networks against the attack used to generate the adversarial training examples, it is computationally-expensive due to the generation process, and it is only effective against the specific type of adversarial examples used during training.

Another augmentation defense of note is randomized smoothing, which is an approach that augments the training dataset with a noisy version of the dataset crafted using Gaussian noise. This approach is premised on the notion that adversarially-robust models also tend to be robust against naturally noisy inputs. Although randomized smoothing reduces the computational overhead introduced by adversarial training (as no adversarial samples need to be generated), the approach is disadvantageous as it weakens the final model comparatively.

In addition to these data augmentation defenses, there have been numerous other methods proposed to improve the adversarial robustness of neural networks, e.g., through the use of pre-processing techniques, or new types of network layers. Many of these techniques rely on gradient shattering, or some variant thereof. In particular, traditional white box adversarial attacks use a network's loss gradient to craft adversarial samples. Gradient shattering breaks these attacks by causing the loss gradient to vanish, usually due to a non-differentiable operation. Prior work has shown that gradient shatter is an ineffective defense, as an adversary is able to adapt, e.g., by skipping over the non-differentiable operations, or by using a rough approximation of the differentiable operation.

Thus, there remains a need in the art to provide techniques to ensure the reliability and robustness of neural network classifiers in the face of adversarial examples.

BRIEF SUMMARY

The technique herein provides for creating and operating an adversarially-robust neural network. The neural network that is configured for adversarial robustness typically comprises a first or input layer, a last or output layer, and one or more intermediate layers that may be hidden. In this approach, the network is augmented to include one or more additional layers that are configured with an encoding scheme that provides an alternative to a traditional one-hot encoding for classes. Preferably, the alternative encoding is a vector-based encoding wherein a particular class label is represented by a vector of 0s and 1s. In one example embodiment, at least one additional layer of this type is positioned between an intermediate layer and the last layer, and wherein the additional layer has a lower dimensionality (i.e., a lesser number of neurons) than the one or more intermediate layers. The alternative layer preferably is a fully-connected layer, and it is sized to include a number of neurons sufficient to uniquely label an output class of the network (using the encoding). Thus, for example, if the neural network is a classifier than has ten (10) output classes, the alternative layer is sized to include at least four (4) neurons, which in this example represents four bit positions ($\geq \sqrt{10}$) representing an encoding of the ten output classes. After including the additional layer and determining its size (given the number of output classes), an encoding is applied to the weights in the layer. The weights comprise a weight matrix, with each row of the matrix being an $i^{th}$ encoding vector for the $i^{th}$ output class. This alternative encoding is sometimes referred to herein as an "n-hot" encoding to distinguish it from traditional 1-hot encoding, and wherein a value of "n" is configured as a hyperparameter. The neural network classifier as augmented to include this additional layer is then trained, typically in a conventional manner. Based on the training, the encoding causes the network to associate a reduced number of active features with each of the hot positions (namely, the 1s in the weight matrix), thereby encouraging the network to learn those features that contain a high amount of information with respect to each class. Thus, the additional layer limits (constrains) the network and, in particular, on the number of features used to predict each class, and/or the layer adds constraints between those features and the output classes. Once trained in this manner, the adversarially-robust neural network is then applied to a classification task.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

Figure 1:
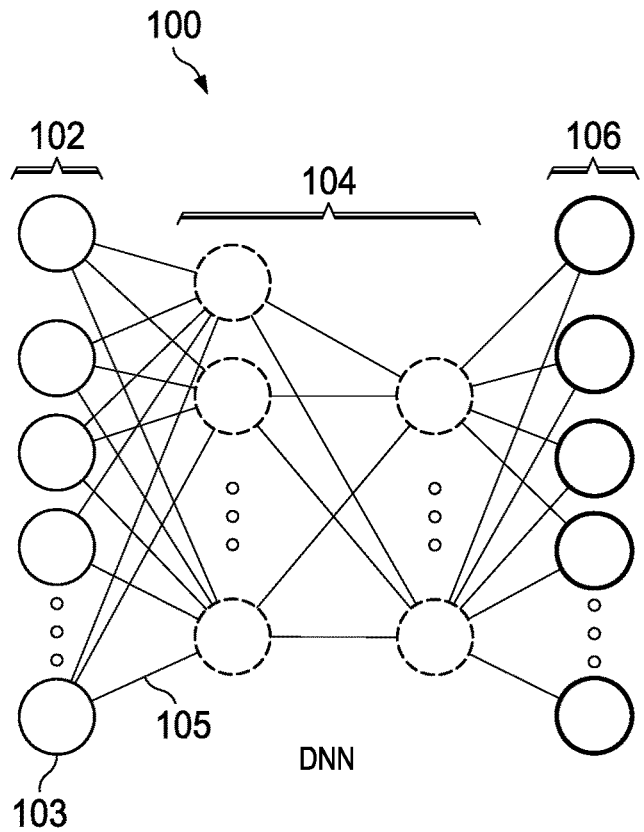
FIG. 1 depicts a representative deep learning model (DNN)

DETAILED DESCRIPTION OF AN
ILLUSTRATIVE EMBODIMENT

As will be seen, the technique herein provides for enhancing the robustness of a neural network against adversarial attack. By way of background, the following provides basic principles of deep learning.

As is well-known, deep learning is a type of machine learning framework that automatically learns hierarchical data representation from training data without the need to handcraft feature representation. Deep learning methods are based on learning architectures called deep neural networks (DNNs), which are composed of many basic neural network units such as linear perceptrons, convolutions and non-linear activation functions. Theses network units are organized as layers (from a few to more than a thousand), and they are trained directly from the raw data to recognize complicated concepts. Lower network layers often correspond with low-level features (e.g., in image recognition, such as corners and edges of images), while the higher layers typically correspond with high-level, semantically-meaningful features.

Specifically, a deep neural network (DNN) takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit, etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters. More formally, let $D=\{x_i, z_i\}^T_{i=1}$ be the training data, where $z_i \cdot [0, n-1]$ is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data.

Formally, a DNN has been described in literature by a function g: $X \rightarrow Y$, where X is an input space, and Y is an output space representing a categorical set. For a sample x that is an element of X, $g(x)=f_L(F_{L-1}( \ldots ((f_i(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

FIG. 1 depicts a representative DNN 100, sometimes referred to an artificial neural network. As depicted, DNN 100 is an interconnected group of nodes (neurons), with each node 103 representing an artificial neuron, and a line 105 representing a connection from the output of one artificial neuron to the input of another. In the DNN, the output of each neuron is computed by some non-linear function of the sum of its inputs. The connections between neurons are known as edges. Neurons and the edges typically have a weight that adjusts as learning proceeds. The weight increases or decreases the strength of the signal at a connection. As depicted, in a DNN 100 typically the neurons are aggregated in layers, and different layers may perform different transformations on their inputs. As depicted, signals (typically real numbers) travel from the first layer (the input layer) 102 to the last layer (the output layer) 104, via traversing one or more intermediate (the hidden layers) 106. Hidden layers 106 provide the ability to extract features from the input layer 102. As depicted in FIG. 1, there are two hidden layers, but this is not a limitation. Typically, the number of hidden layers (and the number of neurons in each layer) is a function of the problem that is being addressed by the network. A network that includes too many neurons in a hidden layer may overfit and thus memorize input patterns, thereby limiting the network's ability to generalize. On the other hand, if there are too few neurons in the hidden layer(s), the network is unable to represent the input-space features, which also limits the ability of the network to generalize. In general, the smaller the network (fewer neurons and weights), the better the network.

The DNN 100 is trained using a training data set, thereby resulting in generation of a set of weights corresponding to the trained DNN. Formally, a training set contains N labeled inputs where the $i^{th}$ input is denoted $(x_i, y_i)$. During training, parameters related to each layer are randomly initialized, and input samples $(x_i, y_i)$ are fed through the network. The output of the network is a prediction $g(x_i)$ associated with the $i^{th}$ sample. To train the DNN, the difference between a predicted output $g(x_i)$ and its true label, $y_i$, is modeled with a loss function, $J(g(x_i), y_i)$, which is back-propagated into the network to update the model parameters.

Typically, a neural network model such as depicted in FIG. 1 accepts numeric values as inputs. To work with categorical data, however, such data typically needs to be encoded in some manner. One-hot encoding is a known technique that converts category data into integers or a vector of ones and zeros. In this approach, the length of the vector is dependent on the number of expected classes or categories, and each element in the vector represents a class. In one-hot encoding, a one is used to indicate the class, and all other values in the vector are zero. Stated another way, if category data is not ordinal, one-hot encoding thus provides a useful way to work with such data. Label encoding converts categorical variables to numerical representations, which are machine-readable.

Figure 2:
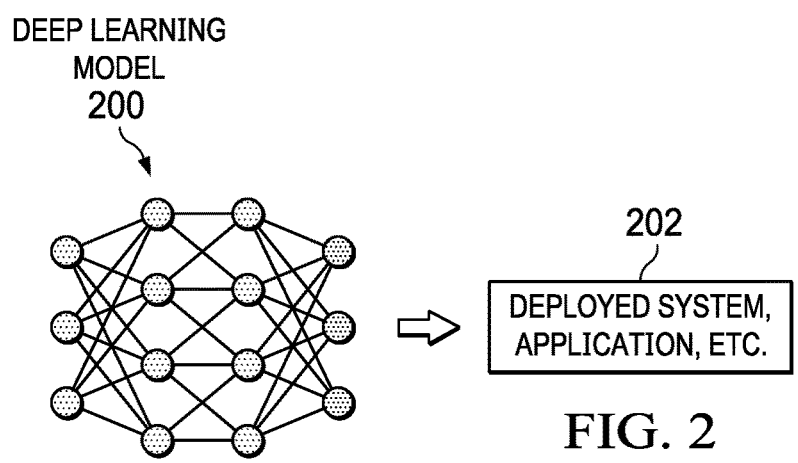
FIG. 2 depicts a deep learning model used in association with a deployed system or application.

FIG. 2 depicts a DNN 200 deployed as a front-end to a deployed system, application, task or the like 202. The deployed system may be of any type in which machine learning is used to support decision-making. As noted above, neural networks such as described are vulnerable to adversarial attacks, which attacks are design to intentionally inject small perturbations ("adversarial examples") to a model's data input to cause misclassifications. In image classification, researchers have demonstrated that imperceptible changes in input can mislead the classifier. In the text domain, synonym substitution or character/word level modification on a few words can also cause the model to misclassify. These perturbations are mostly imperceptible to humans but can easily fool a high-performance deep learning model. For exemplary purposes, it is assumed that the above-described DNN 100 (FIG. 1) or DNN 200 (FIG. 2) is subject to adversarial attack. The technique of this disclosure is then used to enhance the robustness of that network. The resulting network is then said to be adversarially-robust, meaning that—as compared to the network that does not incorporate the described technique—the resulting network is better able to provide the requisite classification task even in the face of adversarial examples.

The particular neural network, the nature of its classification, and/or the particular deployment system or strategy are not limitations of the technique herein, which may be employed to strengthen any type of network classifier regardless of its structure and use.

With the above as background, the technique of this disclosure is now described.

Constraining Neural Networks for Robustness Through Alternative Encoding

Figure 3:
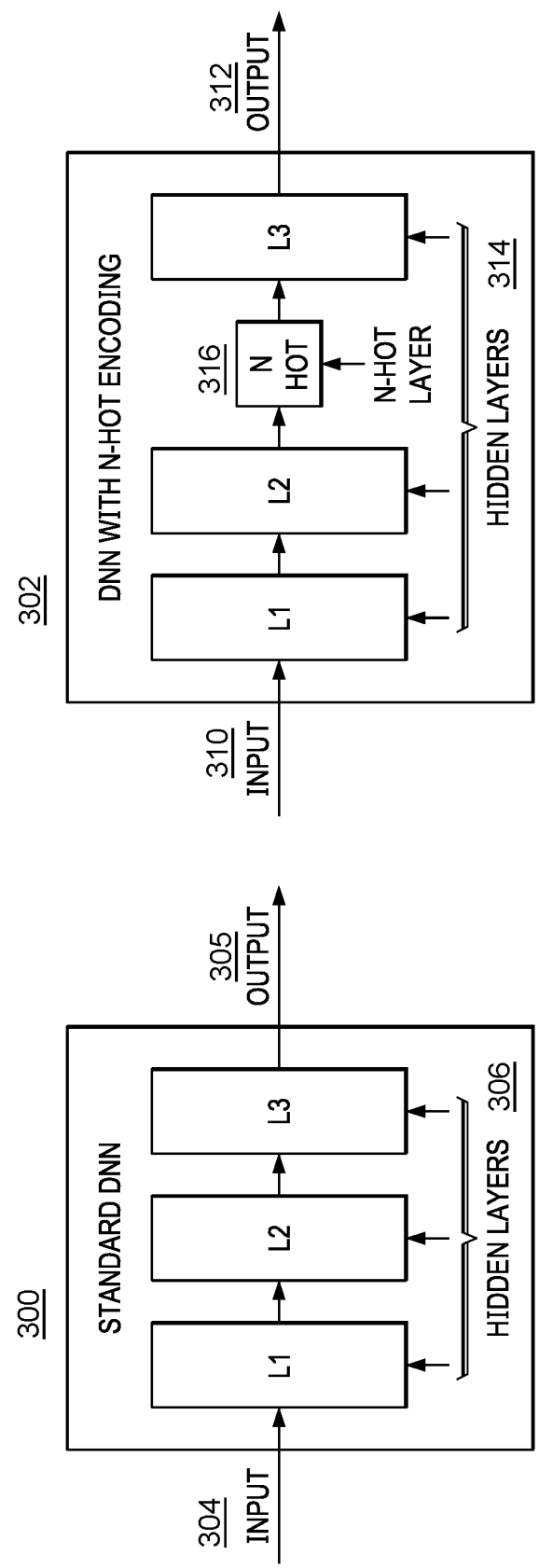
FIG. 3 depicts augmentation of the neural network in FIG. 1 to include an n-hot encoding layer according to this disclosure.

With reference to FIG. 3, the standard DNN 300, as shown on the left, is converted to an adversarially-robust neural network 302, as shown on the right. In this example, the standard DNN 300 comprise an input layer 304, hidden (intermediate) layers (L1, L2 and L3) 306, and output (penultimate) layer 305. The adversarially-robust neural network 302 likewise comprises input layer 310, output layer 312, and hidden layers 314. Standard training creates network 300, but that network is composed of both robust and non-robust features. As such, the network 300 is not adversarially-robust. To address this deficiency, the technique of this disclosure augments the DNN 300 to create the adversarially-robust network 302. As can be seen, the difference between networks 300 and 302 is the inclusion of an additional layer 316 that, as compared to the other intermediate layers, has reduced dimensionality. The notion of dimensionality here is being used in its usual way, i.e., a reference to the number of input variables or features for a particular dataset (in this case the additional layer). As depicted in FIG. 3, the additional layer 316 is positioned in association with the output layer 312, in this case right before the last hidden layer L3. This positioning is not a limitation, however, as the additional layer 316 may also be positioned between the last hidden layer L3 and the output layer 312. Generalizing, the additional layer 316 is positioned then at or near the output layer 312 of the neural network. As used herein, the notion of having reduced dimensionality means that the additional layer has a lesser number of neurons as compared to at least the last intermediate layer to which it is coupled. Although the dimensionality of the additional layer will vary (based on the size of the intermediate layer(s) themselves, preferably the additional layer has significantly lower dimensionality than the one or more (or at least an adjacent) intermediate layer. As will be described, preferably the additional layer 316 is a fully-connected layer. Further, although only one additional layer 316 is depicted in FIG. 3, there may be one or more additional layers that are similar. In one non-limiting embodiment, a fully-connected layer 316 is added before a logit layer (e.g., L3) (or equivalently, after the penultimate layer). In this embodiment, the fully-connected layer has a sigmoid activation, although other activations (e.g., tanh) may be used.

As depicted, the additional layer 316 is sometimes referred to herein as an "n-hot" layer, as it implements an n-hot encoding scheme, as will be further described, and that is an alternative to traditional one-hot encoding for classes. The number of neurons in the n-hot encoding layer 316 preferably is less than the number of neurons in the previous layer, but also the number of neurons is not smaller than a minimum number of bits required to express the number of classifier output classes. For example, if the classifier has ten (10) output classes, then the n-hot layer 316 should have at least four (4) neurons ($\geq \sqrt{10}$) in order to uniquely label a class. An optimal size for the n-hot layer preferably is determined during training, e.g., by experimentation, or some preconfigured sizing may be used subject to the above-described constraints. After adding the n-hot encoding layer 316 to the model and determining the size of the layer, the n-hot encoding, which preferably is a vector of 0s and 1s, is the applied to the weights of the layer. This encoding may be manually-constructed, randomly-generated, or provided through other means deterministically, e.g., using domain knowledge, an ontology, or a knowledge graph.

Figure 4:
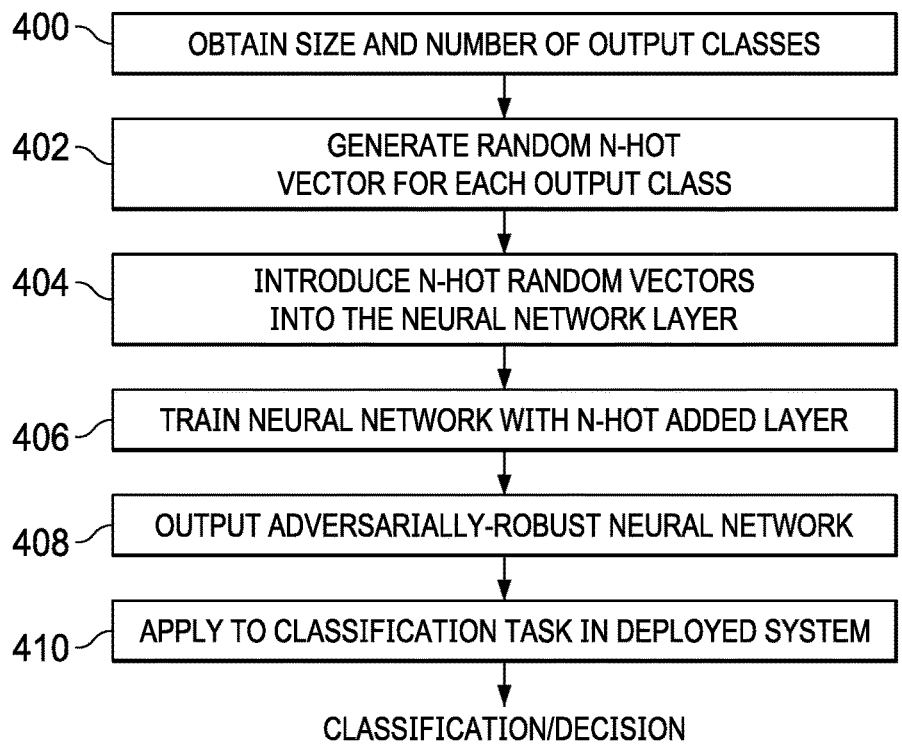
FIG. 4 is a representative process flow for constructing and applying an n-hot encoding used in an additional layer of the neural network according to one embodiment.

FIG. 4 depicts a process flow of one approach to generating the encoding, in this example randomly. At step 400, the size of the layer and the number of output classes is identified. As step 402, a random n-hot vector for each output class is then generated, where the number of hot bits (i.e., the number of 1s) is greater than 0. At step 404, these random p-hot vectors are introduced into the network as fixed weights for connections between the added n-hot layer and the final output layer. More formally, the output of the n-hot encoding layer (where the value n may be set as a hyperparameter) is represented as $y=Wx$, where x is the input to the layer and W is the weight matrix, and the rows of W are $\{E_1, E_2, \ldots E_n\}$, where $E_i$ is the $i^{th}$ random n-hot encoding vector for output class i. In machine learning, a hyperparameter is a parameter whose value is used to control the learning process. As noted, this encoding is sometimes referred to herein as n-hot encoding to distinguish it from traditional 1-hot encoding, and wherein the value of "n" preferably is configured or designated a hyperparameter. The neural network as augmented to include this additional layer is then trained. This is step 406. Based on the training, the encoding causes the network to associate a reduced number of active features with each of the hot positions (namely, the is in the weight matrix), thereby encouraging the network to learn those features that contain a high amount of information with respect to each class. Thus, the additional layer limits (constrains) the network and, in particular, on the number of features used to predict each class, and/or the layer adds constraints between those features and the output classes. Once trained in this manner, the resulting adversarially-robust neural network is then output at step 405. At step 410, i.e. after training, the adversarially-robust neural network is applied to a classification task. As noted above, the nature of the classification task performed by the adversarially-robust network classifier varies, and typically it is dependent on the particular deployment or deployment objective.

Thus, according to this disclosure, one or more layers are added to the neural network and provide an alternative encoding to the traditional one-hot encoding for classes. As described, the n-hot encoding applied to an additional layer is used during training and encourages the network to associate features (a feature set) with each of the hot positions. In the example in FIG. 4, wherein the encodings are randomly-generated, random n-hot vectors are generated for each output class. These random n-hot vectors are introduced into the network as fixed weights for connections between the added n-hot layer and the final output layer. As the network is trained (typically in a normal manner), the fixed encoding weights preferably are left untouched. The output of the n-hot encoding layer is then represented by $y=Wx$, as described above.

As noted, the particular placement of the alternative encoding layer may vary. Typically, it is placed before the penultimate layer so as to minimize noise. That said, technically the layer may be placed anywhere before the last layer. Irrespective of the particular placement, the low dimensionality layer works to find relevant features. In particular, by constraining an intermediate layer to be much lower (in dimensionality) as compared to a surrounding layer, the model in effect needs to perform a compression and decompression (i.e., reconstruction) step around the low dimensional layer. Thus, to maximize the accuracy of the decompression the features that are learned in the low dimensional layer should be the features that contain the most information relevant to each of the output classes. In the n-hot encoding framework as described, it is possible to use either a pre-defined encoding or even a random encoding (by default). When the encoding is then fixed, and given an input for a certain class, the network has to identify what features in the layers prior to the n-hot layer can be combined to obtain the fixed encoding. This type of operation may be more readily apparent when a pre-defined encoding is used instead of random encodings (e.g., digital clock encoding for digits), but the benefits are obtained in both scenarios. In particular, and through training, the network learns to extract the features defined in the n-hot layer rather than just randomly learning a set of relevant features, which is the normal training method.

The technique described above has significant advantages. It is much more computationally-efficient as compared to prior data augmentation techniques, and the approach does not rely on using non-differentiable constructions to hide a loss gradient from an adversary. The technique is simple to implement, as the additional layer has a significantly lower dimensionality than other network layers, and the encoding scheme ensures that the network learns the reduced number of active features quickly and reliably. Further, the approach does not require any changes to the existing training.

Another instantiation of the above-described technique is solving the problem as multi-task learning that trains a classifier to classify the input using multiple sets of classes. An example solution of multi-task learning involves training the above-described model with the weighted sum of the multiple loss functions regarding those sets of classes, including the original set of classes and auxiliary/feature sets of classes. This approach enhances the learned encoding of the input as robust and semantically meaningful, and it also forces the model to use generalizable encoding. For example, consider an image classifier classifying a given image into one of {bird, airplane, dog}. Then, instead of training the classifier to just classify the input into one of the three classes, the approach also may consider other sets, such as {wings, no wings}, and {animal, plant, inanimate}.

The above-described variant embodiment introduce constraints on the shared encoding by the loss functions while each loss function is computed independently. Instead of using each loss function independently, another approach is to first train a neural network to classify the input to feature classes using multi-task learning, and then building a hyper-classifier on top of the inputs with the original set of classes. Then, the hyper-classifier is constrained to use only the extracted features; the hyper-classifier can then be trained or have manual mappings assigned to it. More generally, this approach involves training a classifier to map inputs to features, and then train a new classifier to map the features to output classes. This provides an end-to-end classification pipeline. In any of these variant embodiments, the auxiliary/feature sets of classes or the mappings from such feature sets to the original target classes can be learned using training data, manually crafted, or extracted from an ontology or knowledge graph.

The technique herein may be implemented as an architecture modification, alone or in combination with other existing adversarial defenses such as data augmentation (adversarial training, Gaussian smoothing, and others).

One or more aspects of this disclosure (e.g., augmenting the NN, the testing for adversarial samples, etc.) may be implemented as-a-service, e.g., by a third party. The subject matter may be implemented within or in association with a data center that provides cloud-based computing, data storage or related services.

In a typical use case, a SIEM or other security system has associated therewith an interface that can be used to issue API queries to the trained model, and to receive responses to those queries including responses indicator of adversarial input.

The approach herein is designed to be implemented on-demand, or in an automated manner.

Access to the service for model training or use to identify adversarial input may be carried out via any suitable request-response protocol or workflow, with or without an API.

Figure 5:
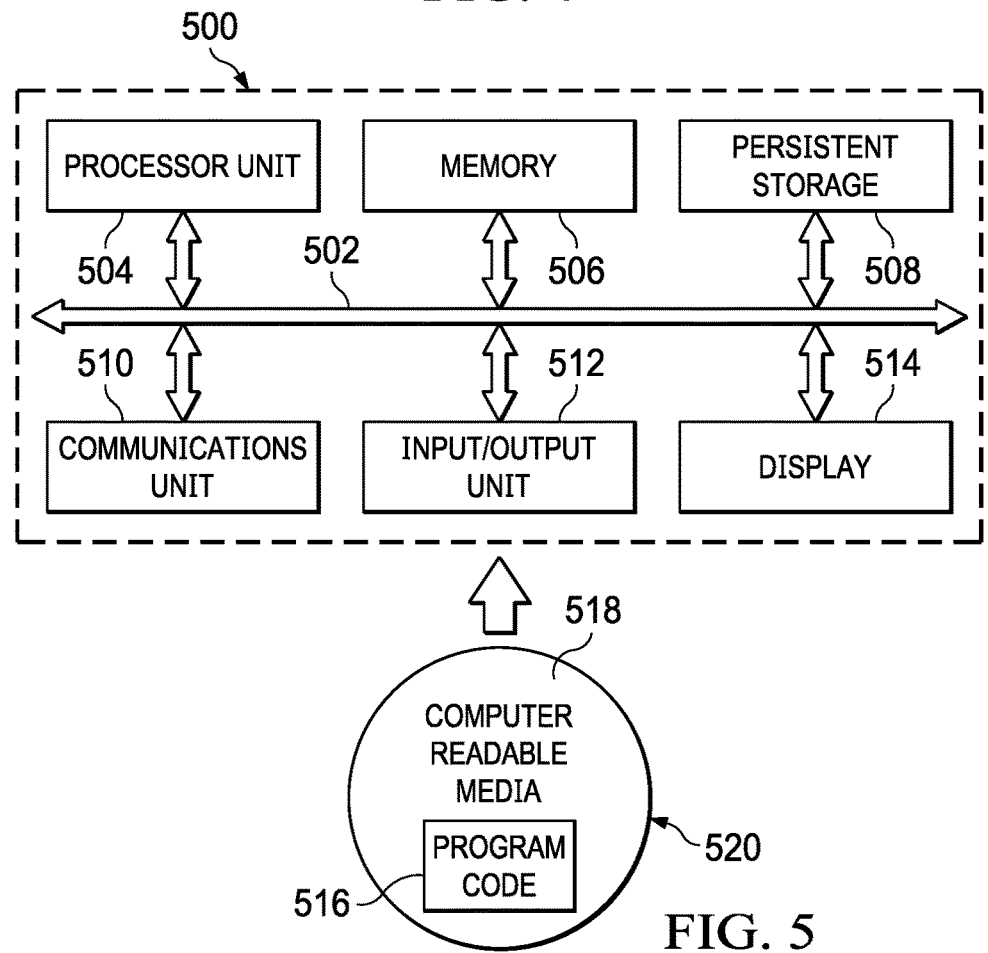
FIG. 5 is a block diagram of a data processing system in which exemplary aspects of the illustrative embodiments may be implemented.

FIG. 5 depicts an exemplary distributed data processing system in which the deployed system or any other computing task associated with the techniques herein may be implemented. Data processing system 500 is an example of a computer in which computer-usable program code or instructions implementing the processes may be located for the illustrative embodiments. In this illustrative example, data processing system 500 includes communications fabric 502, which provides communications between processor unit 504, memory 506, persistent storage 505, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor (SMP) system containing multiple processors of the same type.

Memory 506 and persistent storage 505 are examples of storage devices. A storage device is any piece of hardware that is capable of storing information either on a temporary basis and/or a permanent basis. Memory 506, in these examples, may be, for example, a random access memory or any other suitable volatile or non-volatile storage device. Persistent storage 505 may take various forms depending on the particular implementation. For example, persistent storage 505 may contain one or more components or devices. For example, persistent storage 505 may be a hard drive, a flash memory, a rewritable optical disk, a rewritable magnetic tape, or some combination of the above. The media used by persistent storage 505 also may be removable. For example, a removable hard drive may be used for persistent storage 505.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 505. These instructions may be loaded into memory 506 for execution by processor unit 504. The processes of the different embodiments may be performed by processor unit 504 using computer implemented instructions, which may be located in a memory, such as memory 506. These instructions are referred to as program code, computer-usable program code, or computer-readable program code that may be read and executed by a processor in processor unit 504. The program code in the different embodiments may be embodied on different physical or tangible computer-readable media, such as memory 506 or persistent storage 505.

Program code 516 is located in a functional form on computer-readable media 515 that is selectively removable and may be loaded onto or transferred to data processing system 500 for execution by processor unit 504. Program code 516 and computer-readable media 515 form computer program product 520 in these examples. In one example, computer-readable media 515 may be in a tangible form, such as, for example, an optical or magnetic disc that is inserted or placed into a drive or other device that is part of persistent storage 505 for transfer onto a storage device, such as a hard drive that is part of persistent storage 505. In a tangible form, computer-readable media 515 also may take the form of a persistent storage, such as a hard drive, a thumb drive, or a flash memory that is connected to data processing system 500. The tangible form of computer-readable media 515 is also referred to as computer-recordable storage media. In some instances, computer-recordable media 515 may not be removable.

Alternatively, program code 516 may be transferred to data processing system 500 from computer-readable media 515 through a communications link to communications unit 510 and/or through a connection to input/output unit 512. The communications link and/or the connection may be physical or wireless in the illustrative examples. The computer-readable media also may take the form of non-tangible media, such as communications links or wireless transmissions containing the program code. The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. As one example, a storage device in data processing system 500 is any hardware apparatus that may store data. Memory 506, persistent storage 505, and computer-readable media 515 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The techniques herein may be used with a host machine (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

The system, and in particular the modeling and consistency checking components, typically are each implemented as software, i.e., as a set of computer program instructions executed in one or more hardware processors. The components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates infrastructure. It may be available as a managed service, e.g., provided by a cloud service. A representative deep learning architecture of this type is IBM® Watson® Studio.

The components may implement the workflow synchronously or asynchronously, continuously and/or periodically.

The approach may be integrated with other enterprise- or network-based security methods and systems, such as in a SIEM, APT, graph-based cybersecurity analytics, or the like.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 5 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 5) comprising hardware and software, and these entities communicate with one another over a network, such as the Internet, an intranet, an extranet, a private network, or any other communications medium or link.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the techniques described herein are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, execution threads, and the like.

The techniques herein provide for improvements to another technology or technical field, e.g., deep learning systems, real-world applications of deep learning models including, without limitation, medical classifications, other security systems, as well as improvements to deployed systems that use deep learning models to facilitate command and control operations with respect to those deployed systems.

As previously mentioned, the technique herein may be used in any domain and with any application wherein the neural network classifier may be subject to adversarial attack.

The techniques described herein are not limited for use with any particular type of deep learning model. The approach may be extended to any machine learning model including, without limitation, a Support Vector Machine (SVM), a logistical regression (LR) model, and the like, that has internal processing states (namely, hidden weights), and the approach may also be extended to use with decision tree-based models.

The particular classification task that may be implemented is not intended to be limited. Representative classification tasks include, without limitation, image classification, text recognition, speech recognition, natural language processing, and many others.

Having described the subject matter, what we claim is as follows.

The invention claimed is:

1. A method to constrain and operate a neural network to enhance robustness against adversarial attack, the neural network comprising a first layer, a last layer, and one or more intermediate layers, comprising:
augmenting the neural network by associating a fully-connected additional layer with the last layer, wherein the additional layer has a lower dimensionality than at least one intermediate layer;
applying an encoding to the additional layer, wherein the encoding comprises an encoding vector for each output class;
training the neural network having the additional layer and the applied encoding to learn a reduced feature set representing one or more features containing information with respect to at least one output class;
deploying the trained neural network in association with a decision-making computer system or application; and
performing a classification using the trained neural network, thereby supporting decision-making by the decision-making computer system or application.

2. The method as described in claim 1 wherein the encoding is a vector bit encoding scheme comprising a set of bit vectors, and wherein an $i^{th}$ encoding vector of the set of bit vectors represents an $i^{th}$ output class of the neural network.

3. The method as described in claim 2 further including:
associating a set of fixed encoding weights for connections between the additional layer and the output layer; and
maintaining the fixed encoding weights unchanged by the training.

4. The method as described in claim 1 wherein the training also adds one or more constraints between the one or more features and the output layer.

5. The method as described in claim 1 wherein the additional layer is fully connected using a sigmoid activation and is positioned between a last intermediate layer and the last layer, wherein the last layer is a logit function layer.

6. The method as described in claim 1 wherein the training associates the one or more features for the at least output class with a particular bit position in the encoding vector.

7. The method as described in claim 1 further including sizing the additional layer to include a number of neurons sufficient to encode a unique label for each output class of the neural network.

8. The method as described in claim 1 wherein the training uses a weighted sum of multiple loss functions for a set of classes.

9. An apparatus, comprising:
a processor;
computer memory holding computer program instructions executed by the processor to constrain and operate a neural network to enhance robustness against adversarial attack, the computer program instructions configured to:
associate a fully-connected additional layer with the last layer to augment the neural network, wherein the additional layer has a lower dimensionality than at least one intermediate layer;
apply an encoding to the additional layer, wherein the encoding comprises an encoding vector for each output class;
train the neural network having the additional layer and the applied encoding to learn a reduced feature set representing one or more features that contain information with respect to at least one output class;
deploy the trained neural network in association with a decision-making computer system or application; and
perform a classification using the trained neural network to support decision-making by the decision-making computer system or application.

10. The apparatus as described in claim 9 wherein the encoding is a vector bit encoding scheme comprising a set of bit vectors, and wherein an $i^{th}$ encoding vector of the set of bit vectors represents an $i^{th}$ output class of the neural network.

11. The apparatus as described in claim 9 wherein the computer program instructions are further configured:
associate a set of fixed encoding weights for connections between the additional layer and the output layer;
wherein the fixed encoding weights remain unchanged by the training.

12. The apparatus as described in claim 9 wherein the training also adds one or more constraints between the one or more features and the output layer.

13. The apparatus as described in claim 9 wherein the additional layer is fully connected using a sigmoid activation and is positioned between a last intermediate layer and the last layer, wherein the last layer is a logit function layer.

14. The apparatus as described in claim 9 wherein the training associates the one or more features for the at least output class with a particular bit position in the encoding vector.

15. The apparatus as described in claim 9 wherein the computer program instructions are further configured to size the additional layer to include a number of neurons sufficient to encode a unique label for each output class of the neural network.

16. The apparatus as described in claim 9 wherein the training uses a weighted sum of multiple loss functions for a set of classes.

17. A computer program product in a non-transitory computer readable medium for use in a data processing system to constrain and operate a neural network to enhance robustness against adversarial attack, the neural network comprising a first layer, a last layer, and one or more intermediate layers, the computer program product holding computer program instructions that, when executed by the data processing system, are configured to:
associate a fully-connected additional layer with the last layer to augment the neural network, wherein the additional layer has a lower dimensionality than at least one intermediate layer;
apply an encoding to the additional layer, wherein the encoding comprises an encoding vector for each output class;
train the neural network having the additional layer and the applied encoding to learn a reduced feature set representing one or more features that contain information with respect to at least one output class;
deploy the trained neural network in association with a decision-making computer system or application; and
perform a classification using the trained neural network to support decision-making by the decision-making computer system or application.

18. The computer program product as described in claim 17 wherein the encoding is a vector bit encoding scheme comprising a set of bit vectors, and wherein an $i^{th}$ encoding vector of the set of bit vectors represents an $i^{th}$ output class of the neural network.

19. The computer program product as described in claim 17 wherein the computer program instructions are further configured:
associate a set of fixed encoding weights for connections between the additional layer and the output layer;
wherein the fixed encoding weights remain unchanged by the training.

20. The computer program product as described in claim 17 wherein the training also adds one or more constraints between the one or more features and the output layer.

21. The computer program product as described in claim 17 wherein the additional layer is fully connected using a sigmoid activation and is positioned between a last intermediate layer and the last layer, wherein the last layer is a logit function layer.

22. The computer program product as described in claim 17 wherein the training associates the one or more features for the at least output class with a particular bit position in the encoding vector.

23. The computer program product as described in claim 17 wherein the computer program instructions are further configured to size the additional layer to include a number of neurons sufficient to encode a unique label for each output class of the neural network.

24. The computer program product as described in claim 17 wherein the training uses a weighted sum of multiple loss functions for a set of classes.

* * * * *